Patented July 26, 1949

2,477,491

UNITED STATES PATENT OFFICE 2,477,491

VITAMIN COMPOSITIONS

Henry C. Miller, Indianapolis, Ind., assignor to Eli Lilly and Company, Indianapolis, Ind., a corporation of Indiana No Drawing. Application August 18, 1947, Serial No. 769,323

3 Claims. (Cl. 167—81)

This invention relates to vitamin preparations and more particularly to the prevention of loss of vitamin $B_1$ potency in multiple vitamin preparations.

There are available today many multiple vitamin preparations, comprising mixtures of two or more of the various solid or crystalline vitamins. These preparations are commonly marketed as solid vitamin products, usually in the form of tablets or in gelatin capsules.

A vitamin which, because of its importance to human nutrition, is frequently used in such preparations is that known as the antineuritic vitamin, i. e. vitamin $B_1$. This vitamin is also known as thiamine or thiamine hydrochloride, the latter indicating the form in which it is commercially available. It is known, however, that in many multiple vitamin preparations the vitamin $B_1$ potency of the product decreases markedly with the passage of time. This loss in potency has been shown by chemical and animal tests to result from the actual chemical destruction of the vitamin rather than to any masking or similar effect exerted by other vitamins contained in the preparation. Because of this destruction it has been common for manufacturers to compound many vitamin preparations with as much as 50 percent excess of vitamin $B_1$ in order to offset the loss which occurs between the period of manufacture and ultimate sale to the consumer. This use of an excess of vitamin $B_1$ is disadvantageous not only in that it is wasteful of the relatively expensive thiamine hydrochloride and therefore increases the cost of the product, but also because it eliminates all possibility of marketing a product of constant and uniform vitamin $B_1$ potency suitable for accurate dosage. Furthermore there always exists the possibility that the vitamin $B_1$ content of the marketed product may fall to such a low value as to afford no beneficial therapeutic effect.

The present invention has for its objects the avoidance of the loss of vitamin $B_1$ potency in multiple vitamin preparations, and the provision of multiple vitamin preparations wherein the vitamin $B_1$ potency remains relatively constant over long periods of time. Other objects will be apparent from the following disclosure.

In pursuance of the above and other objects, I have discovered that the marked destruction of the vitamin $B_1$ observed in many multiple vitamin preparations is, in large part, caused by the copresence of the antipellagra vitamin, i. e. nicotinamide or nicotinic acid. I have further discovered that this destructive action may be substantially inhibited and the loss in vitamin $B_1$ potency largely prevented if the antipellagra vitamin contained in the multiple vitamin preparation is incorporated in the preparation as one of several of its acid addition salts. Acid addition salts of the antipellagra vitamin I have found to be highly effective in preventing the undesirable destructive action are the hydrochloric, hydrobromic and nitric acid addition salts.

Thus, in accordance with the above disclosure, my invention comprises the provision of solid multiple vitamin preparations containing vitamin $B_1$ and the antipellagra vitamin, in which the vitamin $B_1$ retains its potency over a long period of time. Moreover, my invention provides a method of protecting vitamin $B_1$ contained in solid, multiple vitamin preparations from the adverse or destructive action of the antipellagra vitamin also contained therein.

The following specific examples are illustrative of vitamin compositions containing vitamin $B_1$ and the antipellagra vitamin, and employing my invention.

Example 1

A multiple vitamin preparation comprising members of the so-called B-complex vitamins and suitable for filling capsules, may be made up in the following proportions, each capsule to contain the amounts of ingredients given below:

| | | |
|---|---|---|
| Thiamine hydrochloride | mg | 10 |
| Riboflavin | mg | 10 |
| Pyridoxine hydrochloride | mg | 5 |
| Calcium pantothenate | mg | 25 |
| Nicotinamide hydrochloride | mg | () |

Example 2

A multiple vitamin preparation comprising vitamin C and vitamins of the B-complex, and suitable for filling capsules is made up in the following proportions, each capsule to contain the amounts of ingredients given below.

| | | |
|---|---|---|
| Thiamine hydrochloride | mg | 1 |
| Riboflavin | mg | 2 |
| Ascorbic acid | mg | 50 |
| Pyridoxine hydrochloride | mg | 0.5 |
| Calcium pantothenate | mg | 3.3 |
| Nicotinamide hydrochloride | mg | 10 |

Example 3

A multiple vitamin preparation comprising several vitamins of the B-complex, and suitable for filling capsules is made up in the following proportions, each capsule to contain the amounts of ingredients given below.

| | | |
|---|---|---|
| Thiamine hydrochloride | mg | 5 |
| Riboflavin | mg | 10 |
| Nicotinic acid hydrochloride | mg | 50 |

Example 4

A multiple vitamin preparation consisting of thiamine hydrochloride and nicotinamide hydrochloride, and suitable for filling capsules is made up in the following proportions, each capsule to contain the amounts of ingredients given below:

Thiamin hydrochloride _____ mg__ 10
Nicotinamide hydrochloride _____ mg__ 150

The illustrative compositions shown in the preceding examples may also contain filler material in quantity sufficient to make up the bulk necessary to insure completely filled capsules. The compositions may if desired be marketed as powders or as tablets. In the latter case it is, of course, as known to the tableting art, desirable to add filler and binder material.

Compositions of the type illustrated by the above examples have been found to retain substantially all of their thiamine hydrochloride potency even when subjected to adverse conditions of heat. The effectiveness of my invention in producing stable vitamin products is illustrated by the table which discloses comparative data as to the stability of thiamine hydrochloride in multiple vitamin products exposed to a temperature of about 120° F. for a period of about 21 days, these conditions representing conditions comparable to an aging period of about one year at ordinary ambient temperatures. The substances employed in the test, in addition to vitamin $B_1$ and nicotinamide, also contained other vitamins of the B-complex, namely riboflavin, pantothenic acid, and pyridoxine.

| Nicotinamide compound present | Percent of thiamine hydrochloride remaining after 21 days at 120° F. | Percent moisture present | pH[1] |
|---|---|---|---|
| Control (no nicotinamide present) | 89 | 3.5 | 4.5 |
| Nicotinamide | 63 | 4.3 | 4.5 |
| Nicotinamide hydrochloride | 96 | 4.2 | 3.9 |
| Nicotinamide hydrobromide | 100 | 4.3 | 3.9 |
| Nicotinamide nitrate | 100 | 4.8 | 3.9 |
| Nicotinamide phosphate | 81 | 3.9 | 3.9 |
| Nicotinamide maleate | 79 | 5.0 | 3.9 |
| Nicotinamide salicylate | 70 | 4.0 | 3.9 |

[1] Determined by testing an aqueous mixture of one part of the composition under test with about 10 parts of water.

From the data in the table it will be observed that the compositions in which the nicotinamide was present as the hydrochloride, hydrobromide or nitrate salt showed substantially the original vitamin $B_1$ potency at the completion of the test, whereas all other compositions containing nicotinamide in some form, showed a loss in vitamin $B_1$ potency of about 20 percent or more.

I am unable to explain the reason for this surprising protective or stabilizing effect. I am acquainted with prior art [Frost et al., J. Am. Chem. Soc. 66, 425 (1944)] which teaches that solutions of thiamine hydrochloride are stable at about pH 4, but this art fails to explain my invention, not only because my stable compositions are solids, but also because the data of the table show that not all salts of the antipellagra vitamin are effective even though the presence of such salts would confer upon the composition, if in solution, a low pH favorable to vitamin $B_1$ stability.

I claim:

1. A solid multiple vitamin preparation comprising vitamin $B_1$ and a member of the group consisting of nicotinamide hydrochloride, nicotinamide hydrobromide, nicotinamide nitrate, nicotinic acid hydrochloride, nicotinic acid hydrobromide and nicotinic acid nitrate.

2. A solid multiple vitamin preparation comprising vitamin $B_1$ and nicotinamide hydrochloride.

3. A solid multiple vitamin preparation comprising vitamin $B_1$ and nicotinic acid hydrochloride.

HENRY C. MILLER.

REFERENCES CITED

The following references are of record in the file of this patent:

UNITED STATES PATENTS

| Number | Name | Date |
|---|---|---|
| 2,433,688 | Fox | Dec. 30, 1947 |

OTHER REFERENCES

Gutman: Modern Drug Encyclopedia, 3rd ed. (1946), page 814. (Copy in Division 43).

Heilbron: Dictionary of Organic Compounds, vol. 3 (1943), page 61. (Copy in Division 59.)

Gautier Compt. Rend., vol. 214, pages 368 to 371, Feb. 23, 1942. (Copy in Scientific Library.)

U. S. Dispensatory, 24th ed. (1947), pages 739. (Copy in Div. 43.)